(12) United States Patent
Mao et al.

(10) Patent No.: US 10,764,748 B2
(45) Date of Patent: Sep. 1, 2020

(54) APPARATUS AND METHOD FOR USER IDENTITY AUTHENTICATION IN PEER-TO-PEER OVERLAY NETWORKS

(75) Inventors: Yinian Mao, San Diego, CA (US); Saumitra M. Das, San Jose, CA (US); Ranjith S. Jayaram, Bridgewater, NJ (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1646 days.

(21) Appl. No.: 12/730,124

(22) Filed: Mar. 23, 2010

(65) Prior Publication Data

US 2011/0078439 A1 Mar. 31, 2011

Related U.S. Application Data

(60) Provisional application No. 61/163,821, filed on Mar. 26, 2009.

(51) Int. Cl.
*H04W 12/06* (2009.01)
*H04L 29/06* (2006.01)
(Continued)

(52) U.S. Cl.
CPC ........... *H04W 12/06* (2013.01); *H04L 63/126* (2013.01); *H04W 12/08* (2013.01);
(Continued)

(58) Field of Classification Search
USPC .......................................... 726/3–5; 713/156
See application file for complete search history.

(56) References Cited

U.S. PATENT DOCUMENTS 7,640,187 B1 * 12/2009 Sonderegger et al. .... 705/26.42
2004/0064693 A1 4/2004 Pabla et al.
(Continued)

FOREIGN PATENT DOCUMENTS

CN 1925393 A 3/2007
CN 101160776 A 4/2008
(Continued)

OTHER PUBLICATIONS

Powell, "OpenID: Decentralised Single Sign-on for the Web", Apr. 2007, Ariadne, Issue 51, pp. 1-11.*
(Continued)

*Primary Examiner* — Benjamin E Lanier
(74) *Attorney, Agent, or Firm* — Loza & Loza, LLP

(57) ABSTRACT

Disclosed is a method for user identity authentication for a peer device joining a peer-to-peer overlay network. In the method, a credential server of the overlay network receives a registered user identity from a joining peer device. The credential server verifies the registered user identity with an identity provider. Upon receiving, at the credential server, successful verification of the registered user identity from the identity provider, the credential server issues to the joining peer device a signed certificate for use by an authenticated peer device in the overlay network to authenticate the registered user identity of the joining peer device, wherein the signed certificate is signed by a private key of the credential server.

32 Claims, 3 Drawing Sheets

(51) Int. Cl.
*H04W 12/08* (2009.01)
*H04L 29/08* (2006.01)

(52) U.S. Cl.
CPC ........ *H04L 63/0823* (2013.01); *H04L 67/104* (2013.01); *H04L 67/1046* (2013.01)

(56) References Cited

U.S. PATENT DOCUMENTS

| | | | |
|---|---|---|---|
| 2005/0177715 A1* | 8/2005 | Somin et al. | 713/156 |
| 2007/0266251 A1 | 11/2007 | Busser et al. | |
| 2008/0072037 A1* | 3/2008 | Narayanan et al. | 713/156 |
| 2008/0114867 A1* | 5/2008 | Thayer et al. | 709/223 |
| 2009/0103702 A1* | 4/2009 | Allen et al. | 379/142.04 |
| 2009/0119747 A1* | 5/2009 | Pierer et al. | 726/1 |
| 2010/0031025 A1* | 2/2010 | Zhang et al. | 713/156 |

FOREIGN PATENT DOCUMENTS

| | | |
|---|---|---|
| JP | 10260985 A | 9/1998 |
| JP | 2002530930 A | 9/2002 |
| JP | 2002297034 A | 10/2002 |
| JP | 2004500742 A | 1/2004 |
| JP | 2009522863 A | 6/2009 |
| JP | 2009212689 A | 9/2009 |
| JP | 2010506312 A | 2/2010 |
| KR | 20060066790 A | 6/2006 |
| WO | WO-0030285 A1 | 5/2000 |
| WO | 0070824 A2 | 11/2000 |
| WO | WO-2004112312 A1 | 12/2004 |
| WO | WO-2007117293 A2 | 10/2007 |
| WO | WO-2008043090 A1 | 4/2008 |
| WO | 2008112048 A1 | 9/2008 |

OTHER PUBLICATIONS

International Search Report and Written Opinion—PCT/US2010/028649, International Search Authority—European Patent Office—dated Jul. 21, 2010.

Taiwan Search Report—TW099109158—TIPO—dated Mar. 5, 2013.

* cited by examiner

APPARATUS AND METHOD FOR USER IDENTITY AUTHENTICATION IN PEER-TO-PEER OVERLAY NETWORKS

CLAIM OF PRIORITY UNDER 35 U.S.C. § 119

The present Application for Patent claims priority to Provisional Application No. 61/163,821 entitled "METHOD FOR USER IDENTITY AUTHENTICATION IN PEER-TO-PEER. OVERLAY NETWORKS" filed Mar. 26, 2009, and assigned to the assignee hereof and hereby expressly incorporated by reference herein.

BACKGROUND

Field

The present invention relates generally to user identity authentication in peer-to-peer overlay networks.

Background

Peer-to-peer (P2P) overlay networks are designed for better scalability, easier user interaction, and easier deployment of applications. Such networks are relatively open, as users may join and leave at will. One problem associated with such dynamic user participation is the uncertainty in user identity. To enable applications such as social networking and file sharing on peer-to-peer networks, consistent and verifiable user identity is desired. Also, for the security of peer-to-peer networks, the user identity needs to be established to allow the build-up of user reputation, and to allow feedback towards user behavior.

One simple solution for user identity in peer-to-peer networks would be to allow the users to claim their own identity, and use the claimed identity in subsequent overlay applications. There are drawbacks to this approach. One drawback is the difficulty in authenticating the claimed identity during the admission of the user into the P2P system, as there will be no prior established authentication credential between the user and P2P overlay. Another drawback is the difficulty for peers in the overlay to verify the identity of other peers. After a user joins the overlay, the user can use an arbitrary user id when communicating with other peers, and other users will have no way to verify the claimed identity.

There is therefore a need for a technique for user identity authentication in peer-to-peer overlay networks.

SUMMARY

An aspect of the present invention may reside in a method for user identity authentication for a peer device joining a peer-to-peer overlay network. In the method, a credential server of the overlay network receives a registered user identity from a joining peer device. The credential server verifies the registered user identity with an identity provider. Upon receiving, at the credential server, successful verification of the registered user identity from the identity provider, the credential server issues to the joining peer device a signed certificate for use by an authenticated peer device in the overlay network to authenticate the registered user identity of the joining peer device, wherein the signed certificate is signed by a private key of the credential server.

In more detailed aspects of the invention, each authenticated peer device in the overlay network may have a public key of the credential server that allows each authenticated peer device to verify that the source of the signed certificate for the joining peer device is the credential server. The credential server may use an OpenID protocol to verify the registered user identity with the identity provider. The signed certificate may comprise the verified registered user identity and the public key of the joining peer device. The signed certificate may further comprise a node identity assigned by the credential server for network operations. Also, at least one authenticated peer device in the overlay network may be unable to establish a connection with the identity provider for verifying a registered user identity.

In more detailed aspects of the invention, the registered user identity of the joining peer device may a globally unique identifier, such as an email address. Also, the registered user identity may be registered with a third-party identity provider.

Another aspect of the invention may reside in a credential server having user identity authentication of a peer device joining a peer-to-peer overlay network. The credential server may include means for receiving a registered user identity from a joining peer device, means for verifying the registered user identity with an identity provider, and means for issuing to the joining peer device a signed certificate, upon receiving successful verification of the registered user identity from the identity provider, for use by an authenticated peer device in the overlay network to authenticate the registered user identity of the joining peer device, wherein the signed certificate is signed by a private key of the credential server.

Another aspect of the invention may reside in a credential server having user identity authentication of a peer device joining a peer-to-peer overlay network. The credential server may include a processor configured to: receive a registered user identity from a joining peer device, verify the registered user identity with an identity provider, and issue to the joining peer device a signed certificate, upon receiving successful verification of the registered user identity from the identity provider, for use by an authenticated peer device in the overlay network to authenticate the registered user identity of the joining peer device, wherein the signed certificate is signed by a private key of the credential server.

Another aspect of the invention may reside in a computer program product, comprising computer-readable medium, comprising code for causing a computer to receive a registered user identity from a joining peer device, code for causing a computer to verify the registered user identity with an identity provider, and code for causing a computer to issue to the joining peer device a signed certificate, upon receiving successful verification of the registered user identity from the identity provider, for use by an authenticated peer device in an overlay network to authenticate the registered user identity of the joining peer device, wherein the signed certificate is signed by a private key of a credential server.

Another aspect of the present invention may reside in a method for user identity authentication for a peer device joining a peer-to-peer overlay network. In the method, the joining peer device provides a registered user identity to a credential server. The credential server provides a public key to each authenticated peer device in the network that allows each authenticated peer device to verify messages from the credential server. The credential server verifies the registered user identity with an identity provider. Upon receiving, at the credential server, successful verification of the registered user identity from the identity provider, the credential server issues to the joining peer device a certificate for use by an authenticated peer device in the network to authenticate the registered user identity of the joining peer device. The certificate is signed by a private key of the credential server.

Another aspect of the invention may reside in an apparatus having user identity authentication for joining a peer-to-peer overlay network. The apparatus may include means for providing a registered user identity of a joining peer device to a credential server, wherein the credential server provides a public key to each authenticated peer device in the network that allows each authenticated peer device to verify messages from the credential server, and means for receiving a certificate from the credential server upon successful verification of the registered user identity with an identity provider, wherein the certificate is for use by an authenticated peer device in the network to authenticate the registered user identity of the joining peer device, and wherein the certificate is signed by a private key of the credential server. The apparatus may comprise a watch, a headset, or a sensing device.

Another aspect of the invention may reside in an apparatus having user identity authentication of a peer device joining a peer-to-peer overlay network. The apparatus may include a processor configured to: provide a registered user identity of a joining peer device to a credential server, wherein the credential server provides a public key to each authenticated peer device in a peer-to-peer overlay network that allows each authenticated peer device to verify messages from the credential server, and receive a certificate from the credential server upon successful verification of the registered user identity with an identity provider, wherein the certificate is for use by an authenticated peer device in the overlay network to authenticate the registered user identity of the joining peer device, and wherein the certificate is signed by a private key of the credential server.

Another aspect of the invention may reside in a computer program product, comprising computer-readable medium, comprising code for causing a computer to provide a registered user identity of a joining peer device to a credential server, wherein the credential server provides a public key to each authenticated peer device in a peer-to-peer overlay network that allows each authenticated peer device to verify messages from the credential server, and code for causing a computer to receive a certificate from the credential server upon successful verification of the registered user identity with an identity provider, wherein the certificate is for use by an authenticated peer device in the network to authenticate the registered user identity of the joining peer device, and wherein the certificate is signed by a private key of the credential server.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 3:
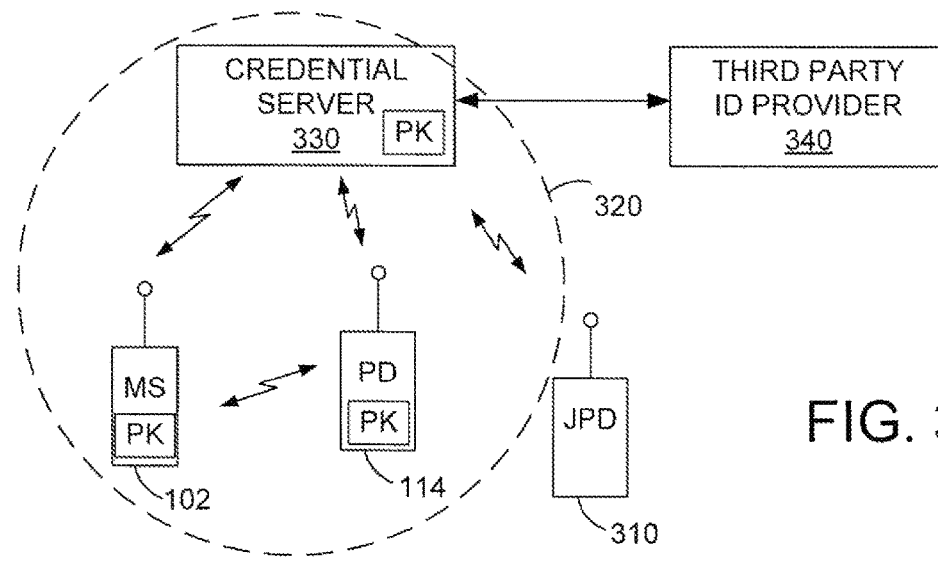
FIG. 3 is a block diagram of a system for user identity authentication for a peer device joining a peer-to-peer overlay network.
Figure 4:
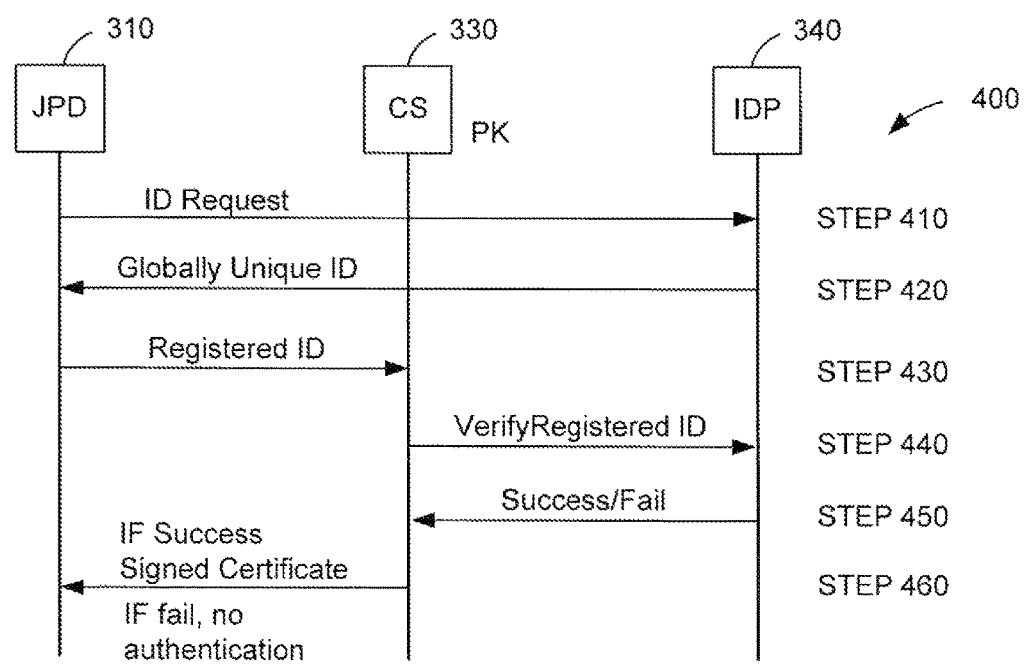
FIG. 4 is a schematic flow diagram for the method for user identity authentication for a peer device joining a peer-to-peer overlay network.

With reference to FIGS. 3 and 4, an aspect of the present invention may reside in a method 400 for user identity authentication for a peer device 310 joining a peer-to-peer (P2P) overlay network 320. In the method, a credential server 330 of the overlay network 320 receives a registered user identity from a joining peer device JPD 310 (step 430). The credential server verifies the registered user identity with an identity provider 340 (steps 440 and 450). Upon receiving, at the credential server, successful verification of the registered user identity from the identity provider, the credential server issues to the joining peer device a signed certificate for use by an authenticated peer device PD 114 in the overlay network to authenticate the registered user identity of the joining peer device (step 460), wherein the signed certificate is signed by a private key of the credential server.

Each authenticated peer device 114 in the overlay network 320 may have a public key PK of the credential server 330 that allows each authenticated peer device to verify that the source of the signed certificate for the joining peer device 310 is the credential server. The signed certificate may comprise the verified registered user identity, the public key PK of the credential server, the public key of the joining peer device, and a node identity assigned to the joining peer device by the credential server for network operations. At least one authenticated peer device in the overlay network may be unable to establish a connection with the identity provider 340 for verifying a registered user identity.

The registered user identity of the joining peer device 310 may be a globally unique identifier, such as an email address. Also, the registered user identity may be registered with a third-party identity provider 340.

Figure 5:
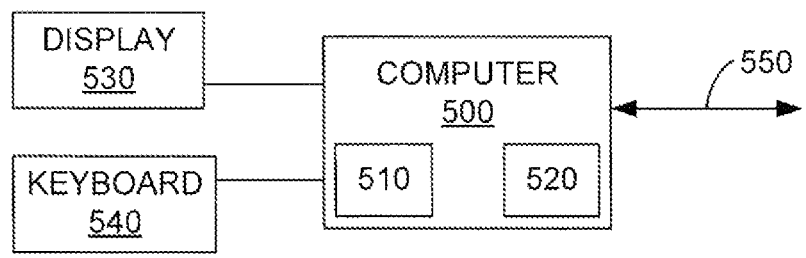
FIG. 5 is a block diagram of a computer including a processor and a memory.

With further reference to FIG. 5, another aspect of the invention may reside in a credential server 330 having user identity authentication for joining a peer-to-peer overlay network 320. The credential server may include means (processor 510) for receiving a registered user identity from a joining peer device 310, means for verifying the registered user identity with an identity provider 340, and means for issuing to the joining peer device a signed certificate, upon receiving successful verification of the registered user identity from the identity provider, for use by an authenticated peer device 114 in the overlay network to authenticate the registered user identity of the joining peer device, wherein the signed certificate is signed by a private key of the credential server.

Another aspect of the invention may reside in a credential server 330 having user identity authentication of a peer device joining a peer-to-peer overlay network 320. The credential server 330 may include a processor 510 configured to: receive a registered user identity from a joining peer device 310, verify the registered user identity with an identity provider 340, and issue to the joining peer device a signed certificate, upon receiving successful verification of the registered user identity from the identity provider, for use by an authenticated peer device 114 in the overlay network to authenticate the registered user identity of the joining peer device, wherein the signed certificate is signed by a private key of the credential server.

Another aspect of the invention may reside in a computer program product, comprising computer-readable medium 520 (such as a computer-readable storage medium), comprising code for causing a computer 500 to receive a registered user identity from a joining peer device 310, code for causing a computer to verify the registered user identity with an identity provider 340, and code for causing a computer to issue to the joining peer device a signed certificate, upon receiving successful verification of the registered user identity from the identity provider, for use by an authenticated peer device 114 in an overlay network 320 to authenticate the registered user identity of the joining peer device, wherein the signed certificate is signed by a private key of a credential server 330.

Figure 2:
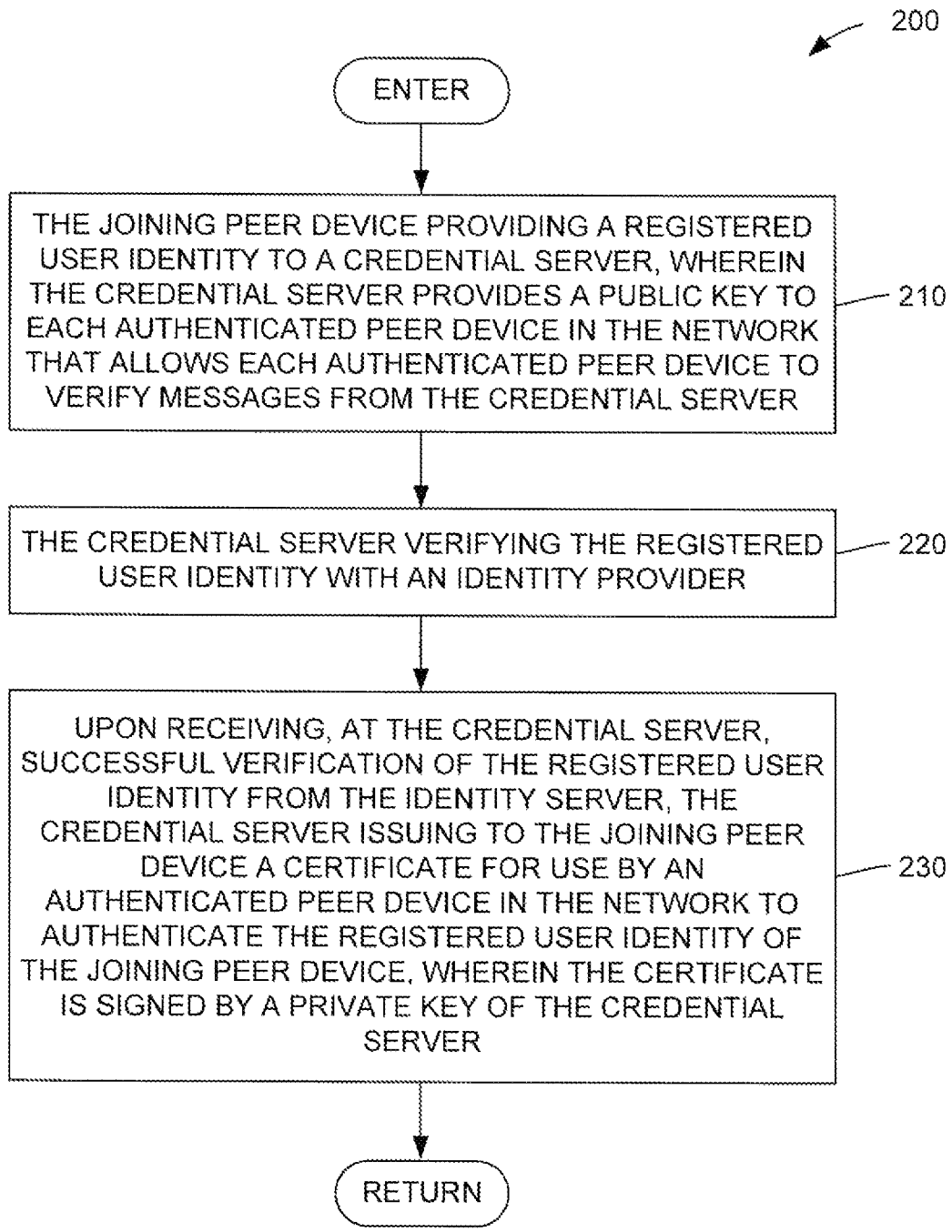
FIG. 2 is a flow diagram of a method for user identity authentication for a peer device joining a peer-to-peer overlay network.

With reference to FIGS. 2 and 3, an aspect of the present invention may reside in a method 200 for user identity authentication for a peer device 310 joining a peer-to-peer (P2P) overlay network 320. In the method, the joining peer device provides a registered user identity ID to a credential server 330 (step 210). The credential server provides a public key PK to each authenticated peer device in the network that allows each authenticated peer device to verify messages from the credential server (step 220). The credential server verifies the registered user identity with an identity provider 340. Upon receiving, at the credential server, successful verification of the registered user identity from the identity provider, the credential server issues to the joining peer device a certificate for use by an authenticated peer device in the network to authenticate the registered user identity of the joining peer device (step 230). The certificate is signed by a private key of the credential server.

Another aspect of the invention may reside in an apparatus 500 having user identity authentication for joining a peer-to-peer overlay network 320. The apparatus may include means (processor 510) for providing a registered user identity of the joining peer device 310 to a credential server 330, wherein the credential server provides a public key PK to each authenticated peer device in the network that allows each authenticated peer device to verify messages from the credential server, and means for receiving a certificate from the credential server upon successful verification of the registered user identity with an identity provider 340, wherein the certificate is for use by an authenticated peer device in the network to authenticate the registered user identity of the joining peer device, and wherein the certificate is signed by a private key of the credential server. The apparatus may comprise a watch, a headset, a sensing device, or a mobile station MS 102.

The apparatus may further include a storage medium 520 such as memory, a display 530, and an input device 540 such as a keyboard. The apparatus may include a wireless connection 550.

Another aspect of the invention may reside in an apparatus 500 having user identity authentication for joining a peer-to-peer overlay network 320. The apparatus may include a processor 510 configured to: provide a registered user identity of the joining peer device 310 to a credential server 330, wherein the credential server provides a public key PK to each authenticated peer device in a peer-to-peer overlay network 320 that allows each authenticated peer device to verify messages from the credential server, and code for causing a computer to receive a certificate from the credential server upon successful verification of the registered user identity with an identity provider 340, wherein the certificate is for use by an authenticated peer device in the network to authenticate the registered user identity of the joining peer device, and wherein the certificate is signed by a private key of the credential server.

Another aspect of the invention may reside in a computer program product, comprising computer-readable medium 520, comprising code for causing a computer 500 to provide a registered user identity of a joining peer device to a credential server 330, wherein the credential server provides a public key PK to each authenticated peer device in a peer-to-peer overlay network 320 that allows each authenticated peer device to verify messages from the credential server, and code for causing a computer to receive a certificate from the credential server upon successful verification of the registered user identity with an identity provider 340, wherein the certificate is for use by an authenticated peer device in the network to authenticate the registered user identity of the joining peer device, and wherein the certificate is signed by a private key of the credential server.

The overlay management employs the credential server 330, which is a central server that all peers in the overlay trust. Public-key cryptography is used to validate messages originated from the credential server. The credential server generates a public/private key pair, and publishes its public key to every peer device. However, the credential server is not directly involved in managing the user identity. Instead, it interfaces with a third party ID provider 340 for user identity authentication.

The credential server 330 obtains user identities by leveraging user identities previously registered with the third party ID provider (steps 410 and 420 of FIG. 4). These user identities need to be globally unique (such as an email address). One way to obtain such user identity is through OpenID. OpenID is an open identity management framework supported by major internet companies such as Google, Yahoo, IBM, Microsoft, VeriSign, etc. The OpenID protocol allows an entity to verify a user's identity registered with an ID provider (Yahoo, for example), as long as the verifying entity implements the OpenID protocol to interface with the corresponding ID Provider.

In a peer-to-peer network, some peer devices may not have capability to implement OpenID protocol, and may not have an internet connection. Requiring every node (peer) to implement OpenID and verify peer identities on the fly may be unduly burdensome and difficult. The present technique only requires the peers to store the public key of the credential server and be able to verify the messages from the credential server. When a new user joins the peer-to-peer network, it contacts the credential server 330 and provides its identity registered with the third party ID provider 340. The credential server then executes the OpenID protocol as a relying party. Briefly, the credential server establishes a connection with the ID provider, and redirects the incoming user to the ID provider for ID verification. Once this is done, the ID provider sends a message to the credential server indicating the success or failure of the ID verification. In the case that ID verification succeeded, the credential server issues a signed certificate to the incoming peer. The certificate may include, but not limited, to, the verified ID, the public key of the joining peer, the node id assigned for P2P network operations, and be signed by the credential server using its private key. Existing peers in the network can use the certificate to authenticate the identity of the new peer.

There are technical advantages provided by the method. The ID verification by existing peers in the network is distributed, in the sense that they do not need to connect to a central server for id verification. This alleviates the requirement of having an internet link for id verification. The peer-to-peer network 320 can leverage existing applications, such as social network, for user identities. The credential server 330 is the root of trust within the P2P network. A peer 114 only needs to know the public key of the credential server's signature to verify another peer's identity, even though that id is registered with third party ID provider 340.

Alternative solutions, such as requiring each peer to be fully equipped with OpenID, each peer to register its identity directly with the credential server, may require substantially more communication overhead and protocol complexity during id verification, and/or may require much larger overhead to the credential server.

Advantageously, the credential server 330 validates a user identity from a third party ID provider 340 (e.g. using Open ID protocol), and on successful verification, issues a certificate to the user containing the user id and signed by the credential server's private key. A peer that operates within the P2P network is equipped with the public key of the said credential server and verifies the identity of another peer by checking the certificate using a public-key cryptography algorithm with the public key.

The credential server 330 may use the OpenID protocol to verify the registered user identity with the identity provider. The details of the Open Authentication Protocol is available at: opened-dot-net/developers/specs/.

Figure 1:
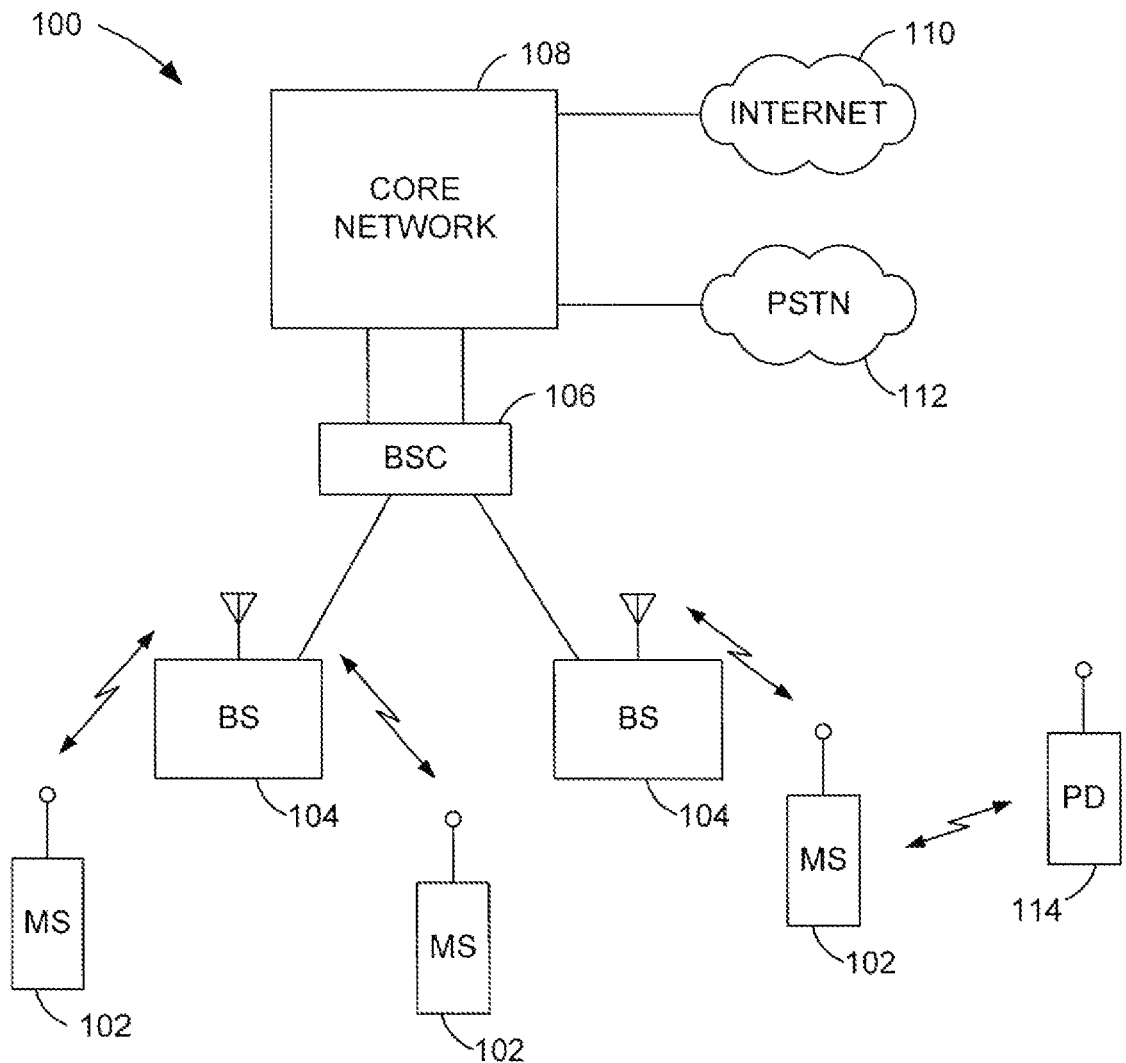
FIG. 1 is a block diagram of an example of a wireless communication system.

With reference to FIG. 1, a wireless mobile station (MS) 102 may communicate with one or more base stations (BS) 104 of a wireless communication system 100. The MS may further pair with a wireless peer device 114. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device, 102 or 114, may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for user identity authentication of a peer device joining a peer-to-peer overlay network, comprising:
   receiving, by a credential server of the overlay network, a registered user identity from a joining peer device, wherein the registered user identity from the joining peer device is a globally unique identifier;
   connecting, by the credential server, to a third party identity provider for verification of the registered user identity; and
   upon receiving, at the credential server, successful verification of the registered user identity from the third party identity provider, the credential server issuing to the joining peer device a signed certificate for use by an authenticated peer device in the overlay network to authenticate the registered user identity of the joining peer device, wherein:
      the signed certificate is signed by a private key of the credential server; and
      the signed certificate comprises the verified registered user identity, a node identity, and a public key of the joining peer device.

2. A method for user identity authentication as defined in claim 1, wherein each authenticated peer device in the overlay network has a public key of the credential server that allows each authenticated peer device to verify that the source of the signed certificate for the joining peer device is the credential server.

3. A method for user identity authentication as defined in claim 1, wherein the credential server uses an OpenID protocol for verifying the registered user identity with the third party identity provider.

4. A method for user identity authentication as defined in claim 1, wherein the signed certificate further comprises a public key of the credential server.

5. A method for user identity authentication as defined in claim 1, wherein the node identity is assigned by the credential server for peer-to-peer overlay network operations.

6. A method for user identity authentication as defined in claim 1, wherein at least one authenticated peer device in the overlay network is unable to establish a connection with the third party identity provider for verifying a registered user identity.

7. A method for user identity authentication as defined in claim 1, wherein the registered user identity is previously registered with the third-party identity provider.

8. A method for user identity authentication as defined in claim 1, wherein the registered user identity is an email address.

9. A credential server having user identity authentication of a peer device joining a peer-to-peer overlay network, the credential server comprising:
   means for receiving a registered user identity from a joining peer device, wherein the registered user identity from the joining peer device is a globally unique identifier;
   means for connecting to a third party identity provider for verification of the registered user identity; and
   means for issuing to the joining peer device a signed certificate, upon receiving successful verification of the registered user identity from the third party identity provider, for use by an authenticated peer device in the overlay network to authenticate the registered user identity of the joining peer device, wherein:
      the signed certificate is signed by a private key of the credential server; and
      the signed certificate comprises the verified registered user identity, a node identity, and a public key of the joining peer device.

10. A credential server as defined in claim 9, wherein each authenticated peer device in the overlay network has a public key of the credential server that allows each authenticated peer device to verify that the source of the signed certificate for the joining peer device is the credential server.

11. A credential server as defined in claim 9, wherein the credential server uses an OpenID protocol for verifying the registered user identity with the third party identity provider.

12. A credential server as defined in claim 9, wherein the signed certificate further comprises a public key of the credential server.

13. A credential server as defined in claim 9, wherein the node identity is assigned by the credential server for peer-to-peer overlay network operations.

14. A credential server as defined in claim 9, wherein at least one authenticated peer device in the overlay network is unable to establish a connection with the third party identity provider for verifying a registered user identity.

15. A credential server as defined in claim 9, wherein the registered user identity is previously registered with the third-party identity provider.

16. A credential server as defined in claim 9, wherein the registered user identity is an email address.

17. A credential server having user identity authentication of a peer device joining a peer-to-peer overlay network, the credential server comprising:
    a processor configured to:
        receive a registered user identity from a joining peer device, wherein the registered user identity from the joining peer device is a globally unique identifier;
        connect to a third party identity provider for verification of the registered user identity; and
        issue to the joining peer device a signed certificate, upon receiving successful verification of the registered user identity from the third party identity provider, for use by an authenticated peer device in the overlay network to authenticate the registered user identity of the joining peer device, wherein:
            the signed certificate is signed by a private key of the credential server; and
            the signed certificate comprises the verified registered user identity, a node identity, and a public key of the joining peer device.

18. A credential server as defined in claim 17, wherein each authenticated peer device in the overlay network has a public key of the credential server that allows each authenticated peer device to verify that the source of the signed certificate for the joining peer device is the credential server.

19. A credential server as defined in claim 17, wherein the credential server uses an OpenID protocol for verifying the registered user identity with the third party identity provider.

20. A credential server as defined in claim 17, wherein the signed certificate further comprises a public key of the credential server.

21. A credential server as defined in claim 17, wherein the node identity is assigned by the credential server for peer-to-peer overlay network operations.

22. A credential server as defined in claim 17, wherein at least one authenticated peer device in the overlay network is unable to establish a connection with the third party identity provider for verifying a registered user identity.

23. A credential server as defined in claim 17, wherein the registered user identity is previously registered with the third-party identity provider.

24. A credential server as defined in claim 17, wherein the registered user identity is an email address.

25. A computer program product, comprising:
    non-transitory computer readable medium, comprising:
        code for causing a computer to receive a registered user identity from a joining peer device, wherein the registered user identity from the joining peer device is a globally unique identifier;
        code for causing a computer to connect to a third party identity provider for verification of the registered user identity; and
        code for causing a computer to issue to the joining peer device a signed certificate, upon receiving successful verification of the registered user identity from the third party identity provider, for use by an authenticated peer device in an overlay network to authenticate the registered user identity of the joining peer device, wherein:
            the signed certificate is signed by a private key of a credential server; and
            the signed certificate comprises the verified registered user identity, a node identity, and a public key of the joining peer device.

26. A computer program product as defined in claim 25, wherein each authenticated peer device in the overlay network has a public key of the credential server that allows each authenticated peer device to verify that the source of the signed certificate for the joining peer device is the credential server.

27. A computer program product as defined in claim 25, wherein the credential server uses an OpenID protocol for verifying the registered user identity with the third party identity provider.

28. A computer program product as defined in claim 25, wherein the signed certificate further comprises a public key of the credential server.

29. A computer program product as defined in claim 25, wherein the node identity is assigned by the credential server for peer-to-peer overlay network operations.

30. A computer program product as defined in claim 25, wherein at least one authenticated peer device in the overlay network is unable to establish a connection with the third party identity provider for verifying a registered user identity.

31. A computer program product as defined in claim 25, wherein the registered user identity is previously registered with the third-party identity provider.

32. A computer program product as defined in claim 25, wherein the registered user identity is an email address.

* * * * *